(12) United States Patent
Hsu et al.

(10) Patent No.: US 7,845,690 B2
(45) Date of Patent: Dec. 7, 2010

(54) FOLDING ELECTRONIC DEVICE AND ENGAGING STRUCTURE

(75) Inventors: Chih-Chiang Hsu, Tao Yuan Shien (TW); Wen-Chi Huang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 110 days.

(21) Appl. No.: 11/969,932

(22) Filed: Jan. 7, 2008

(65) Prior Publication Data

US 2009/0058101 A1    Mar. 5, 2009

(30) Foreign Application Priority Data

Sep. 4, 2007    (TW) .............................. 96132868 A

(51) Int. Cl.
   *E05C 19/10*    (2006.01)
(52) U.S. Cl. .................. 292/97; 292/107; 292/DIG. 4; 292/DIG. 16; 292/DIG. 38
(58) Field of Classification Search .................. 292/97, 292/56, 71, 76, 63, 64, 80, 81, 84, 110, 125, 292/108, 107 X, 209.21, 300, 302–304, 341.15, 292/341.17, DIG. 4 X, DIG. 37; 361/679.57, 361/679.58
See application file for complete search history.

(56) References Cited

U.S. PATENT DOCUMENTS

| | | | | | |
|---|---|---|---|---|---|
| 1,126,836 | A | * | 2/1915 | Newton ......................... 16/85 |
| 4,655,489 | A | * | 4/1987 | Bisbing ....................... 292/110 |
| 4,657,291 | A | * | 4/1987 | Kurosaki ......................... 292/6 |
| 4,660,871 | A | * | 4/1987 | Arakawa et al. ............... 292/81 |
| 5,346,297 | A | * | 9/1994 | Colson et al. ................ 312/215 |
| 5,401,067 | A | * | 3/1995 | Kurosaki et al. .............. 292/63 |
| 6,068,307 | A | * | 5/2000 | Murphy ....................... 292/302 |
| 6,115,239 | A | * | 9/2000 | Kim ....................... 361/679.57 |
| 6,250,694 | B1 | * | 6/2001 | Weiland ..................... 292/110 |
| 2009/0079203 | A1 | * | 3/2009 | Huang .......................... 292/64 |

* cited by examiner

*Primary Examiner*—Peter M. Cuomo
*Assistant Examiner*—Mark Williams
(74) *Attorney, Agent, or Firm*—Thomas, Kayden, Horstemeyer & Risley

(57) ABSTRACT

A folding electronic device includes a cover and a main body. The cover includes a groove. The main body includes an engaging structure. The engaging structure includes a pushing element, an elastic element connected to the pushing element, an engaging element and a base. The engaging element includes a first connector and an engaging portion. The first connector is disposed on two sides of the engaging portions. The engaging portion is connected to or is detached from the groove. The base comprises an accommodating portion and a second connector. The pushing element and the elastic element are disposed in the accommodating portion. The second connector is disposed on two sides of the base. The engaging element is installed across the base. The first connector pivots on the second connector.

14 Claims, 5 Drawing Sheets

FOLDING ELECTRONIC DEVICE AND ENGAGING STRUCTURE

BACKGROUND OF THE INVENTION

1. Field of the Invention

The invention relates to a folding electronic device and an engaging structure.

2. Description of the Related Art

A conventional folding electronic device comprises a main body, a cover and an engaging structure. If a user opens the folding electronic device, a button is pressed and then a user can open the cover. When the button is pressed but a user does not open the cover instantly, the engaging structure may move back to a closed position. The conventional engaging structure comprises a lot of links, thus, the conventional engaging structure can not provide a tight-fitting structure. Along with rapid advancements in science and technology, an electronic device has become smaller. If a lot of links are installed in an electronic device, the volume of the electronic device can not be shrunk.

BRIEF SUMMARY OF INVENTION

A detailed description is given in the following embodiments with reference to the accompanying drawings. The invention provides a folding electronic device. The folding electronic device comprises a cover and a main body. The cover comprises a groove. The main body comprises an engaging structure. The engaging structure comprises a pushing element, an elastic element connected to the pushing element, an engaging element and a base. The engaging element comprises a first connector and an engaging portion. The first connector is disposed on two sides of the engaging portion. The engaging portion is connected to or detached from the groove. The base comprises an accommodating portion and a second connector. The pushing element and the elastic element are disposed in the accommodating portion. The second connector is disposed on two sides of the base. The engaging element is installed across the base. The first connector pivots on the second connector. When the engaging element is forced to rotate and separate the engaging portion from the groove, the pushing element is bounced to push the object.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
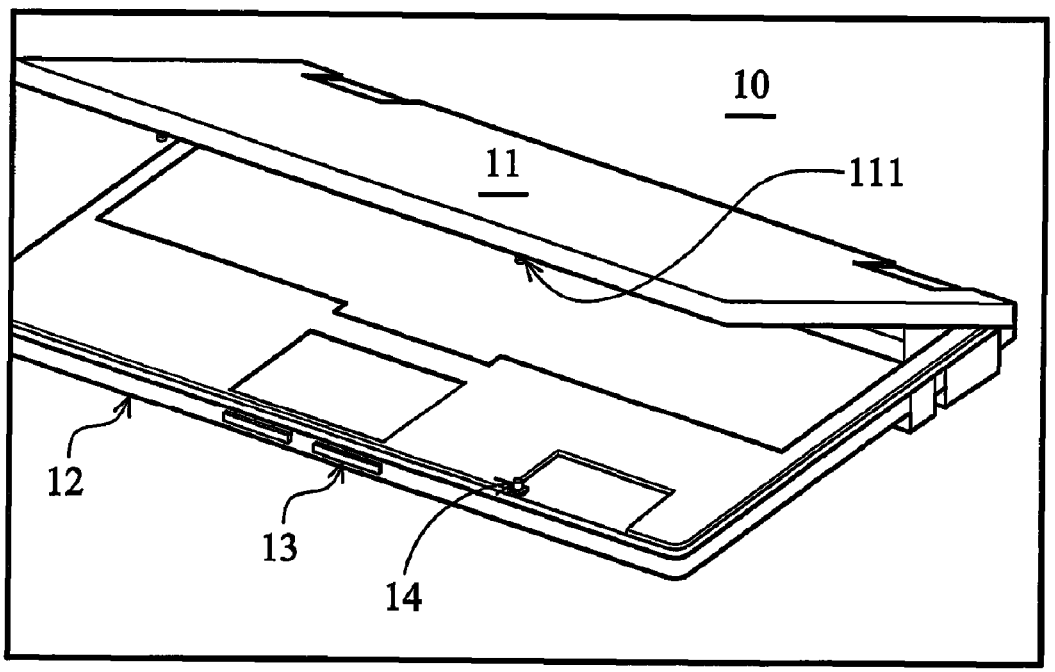
FIG. 1 is a schematic view of a folding electronic device according to the invention.
Figure 2:
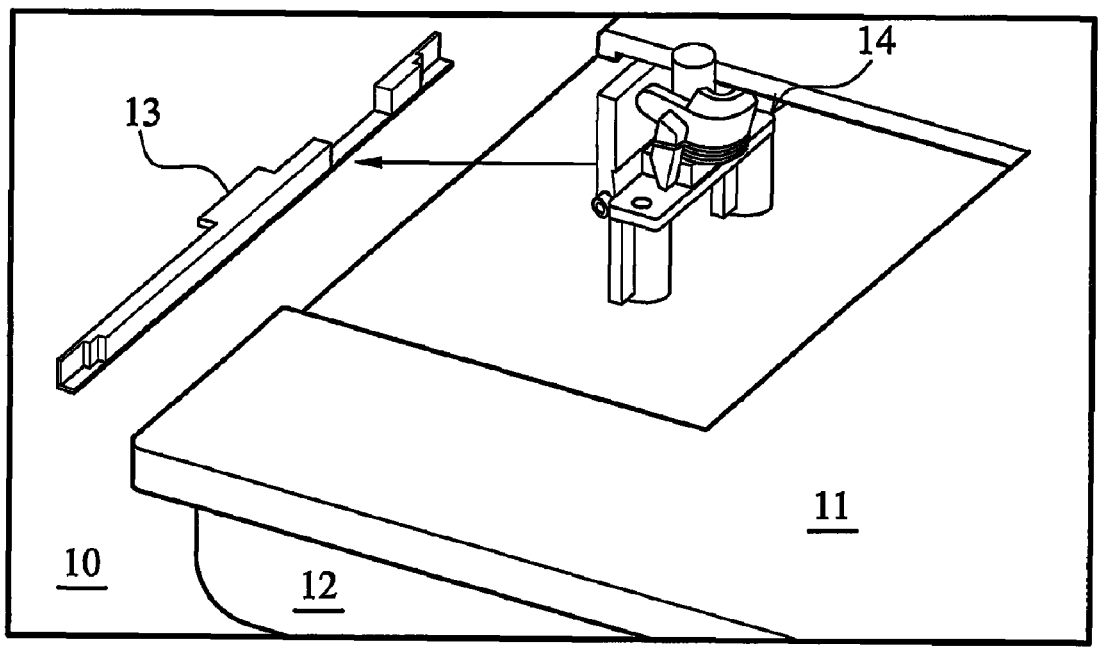
FIG. 2 is a schematic view of an engaging structure installed in a folding electronic device according to the invention.

Referring to FIGS. 1 and 2, FIG. 1 is a schematic view of a folding electronic device 10 and FIG. 2 is a schematic view of an engaging structure 14 installed in a folding electronic device 10, both, according to the invention. In this embodiment, the folding electronic device 10, for example a notebook, comprises a cover 11, a main body 12 and a button 13. The cover 11 comprises a tenon 111. The tenon 111 comprises a groove 112 (shown in FIG. 4A). The main body 12 comprises an engaging structure 14 (shown in FIG. 2). The button 13 is movably disposed on the main body 12. The button 13 is disposed corresponding to the engaging structure 14 (shown in FIG. 2). In this embodiment, the button 13 pushes the engaging structure 14 to direct the tenon 111 to fix or release the engaging structure 14. Thus, when the cover 11 of the notebook is closed, the cover 11 is fixed to the main body 12. When the cover 11 of the notebook is opened, the cover 11 is pushed to separate from the main body 12.

Figure 3:
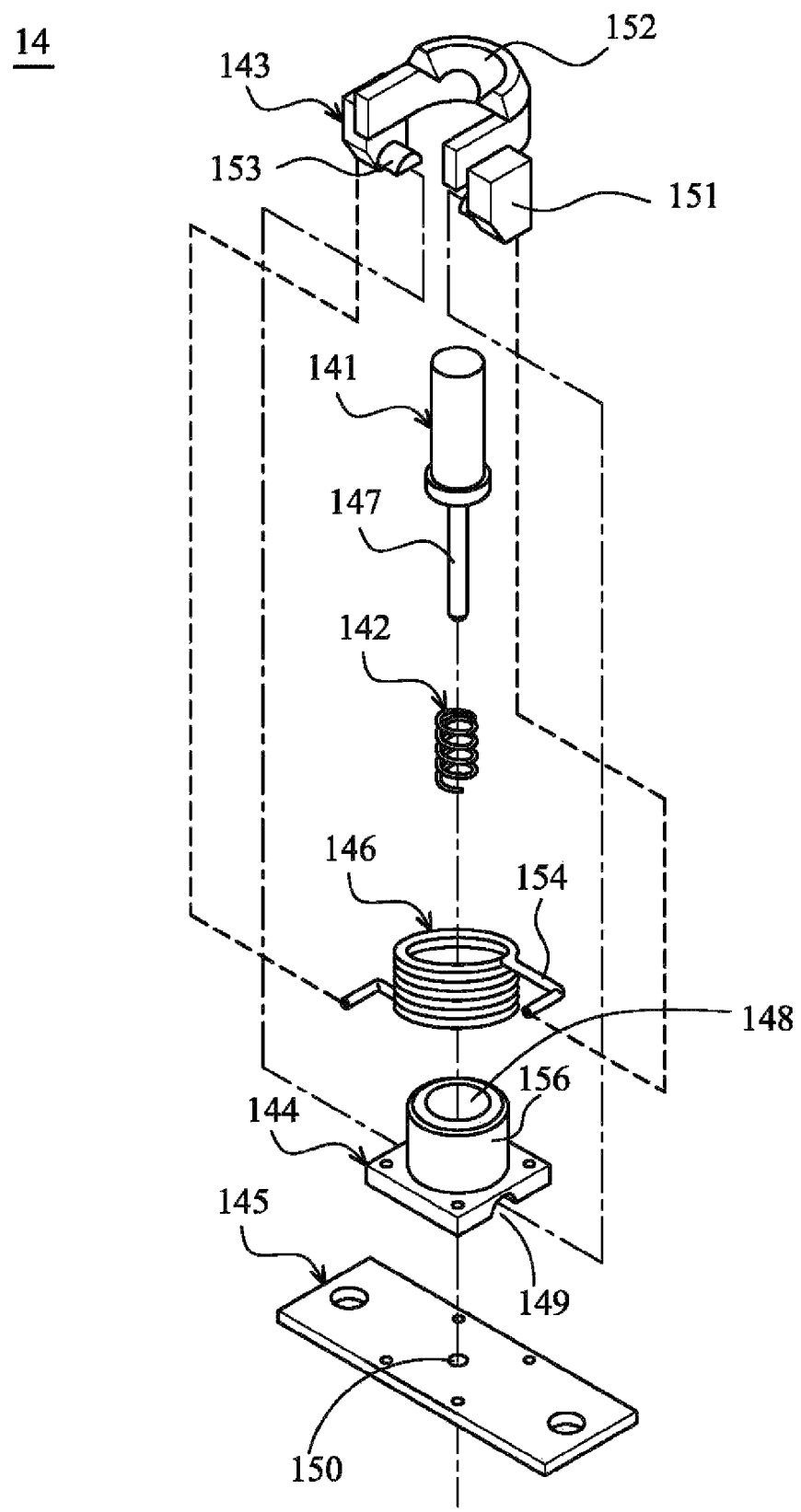
FIG. 3 is an exploded view of an engaging structure according to the invention.

Referring to FIG. 3, FIG. 3 is an exploded view of an engaging structure 14 according to the invention. The engaging structure 14 comprises a pushing element 141, an elastic element 142, an engaging element 143, a base 144, a fixing plate 145 and a spring 146. The pushing element 141 comprises a bar 147. The base 144 comprises an accommodating portion 156, a second connector 149 and a sidewall 148. The sidewall 148 disposed around the accommodating portion 156. The bar 147 passes through the elastic element 142. Then both the bar 147 and the elastic element 142 are installed in the accommodating portion 156 of base 144. The fixing plate 145 comprises a hole 150. After installing the bar 147 and the elastic element 142 in the accommodating portion 156, the base 144 is fixed on the fixing plate 145. The bar 147 passes through the hole 150 of the fixing plate 145. The engaging element 143 is installed across the base 144. The engaging element 143 comprises a first connector 151 and an engaging portion 152. The engaging portion 152 is connected to or detached from the groove 112 (shown in FIG. 4A). The first connector 151 is disposed on two sides of the engaging portion 152. The second connector 149 is disposed on two sides of the base 144. In this embodiment, the first connector 151 comprises a pivoting portion 153 protruding toward the second connector 149. In this embodiment, the second connector 149 is an opening. The first connector 151 is pivoted on the second connector 149. Thus, the engaging element 143 is pivoted on the base 144. The spring 146 comprises a hook 154 on one side thereof. The spring 146 surrounds the sidewall 148. The hook 154 is connected to the first connector 151 for fixing to the engaging element 143. Note that the accommodating portion 156 is tubular for containing the engaging element 141.

Figure 4A:
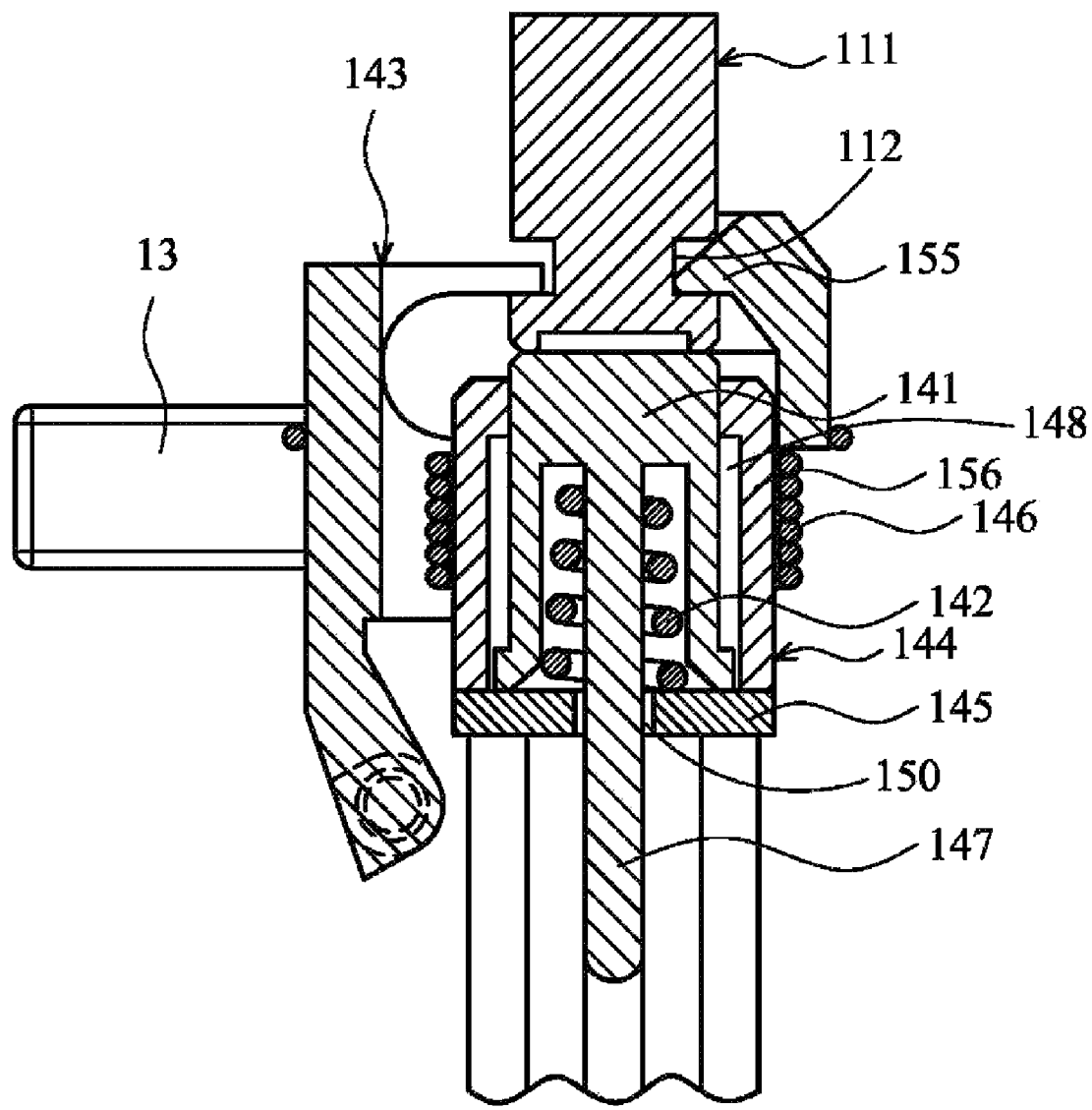
FIGS. 4A to 4C are schematic views showing the opening of a folding electronic device according to the invention.
Figure 4B:
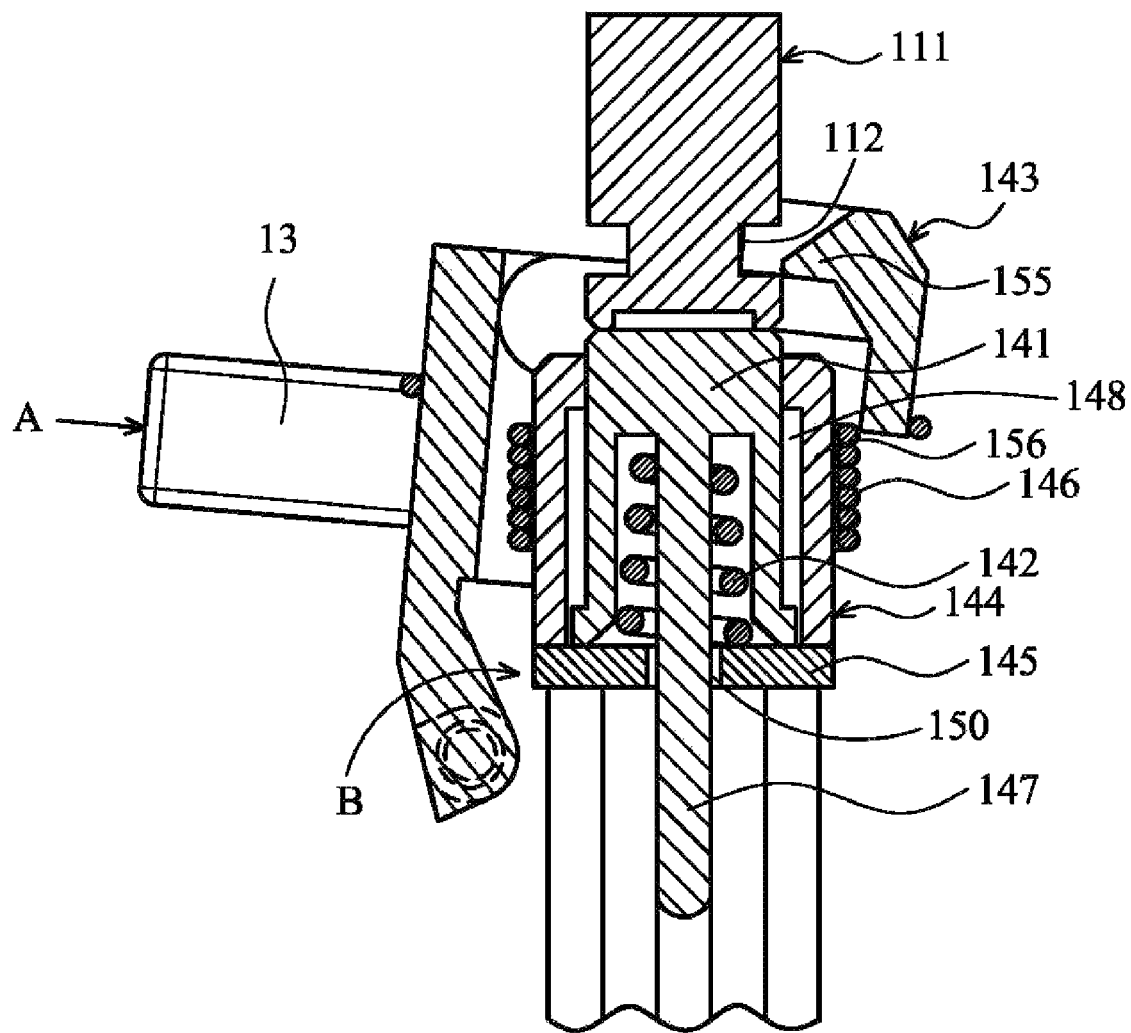
Figure 4C:
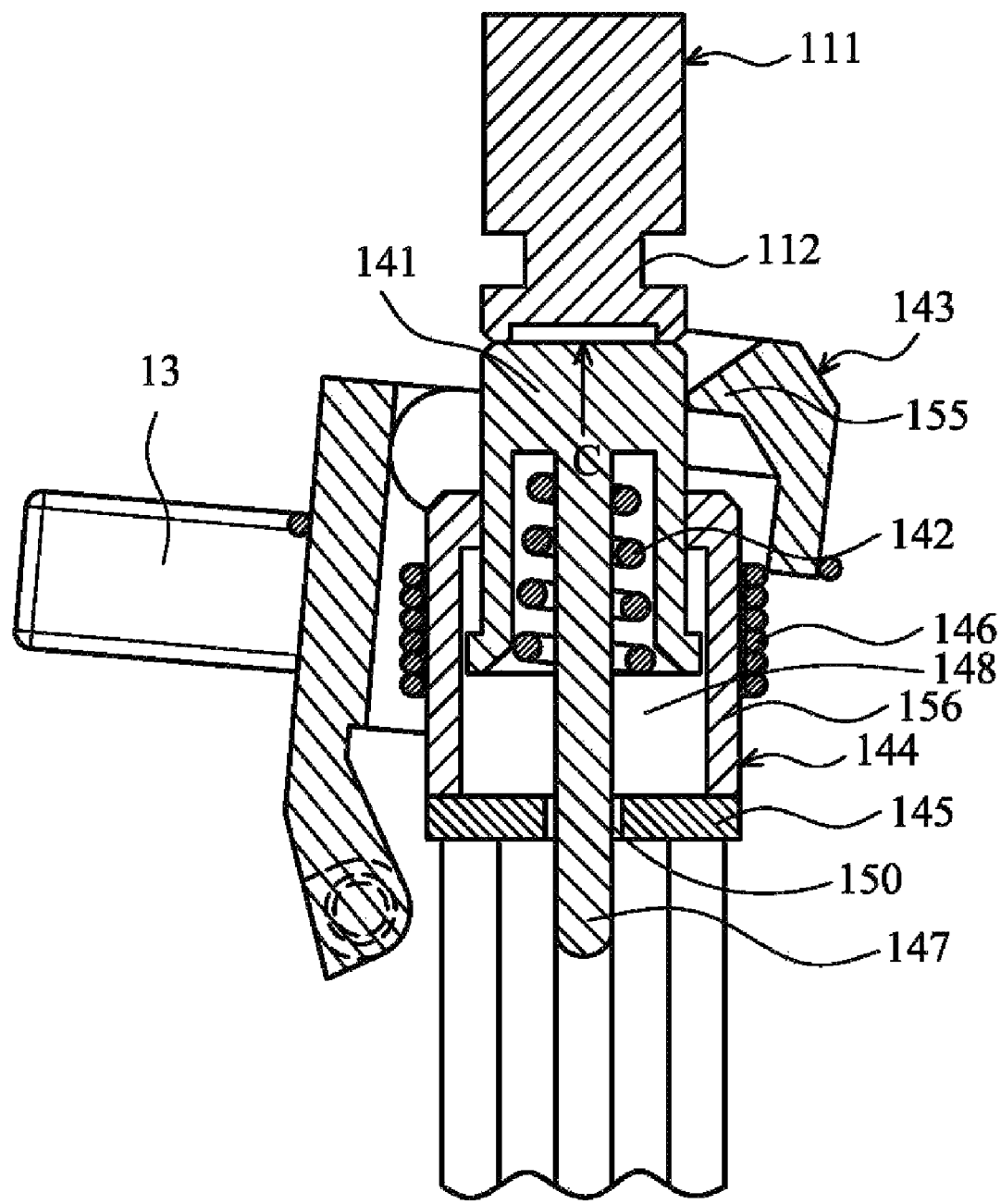

Referring to FIGS. 4A to 4C, FIGS. 4A to 4C are schematic views showing the opening of a folding electronic device 10 according to the invention. FIG. 4A is a schematic view showing a folding electronic device 10 in closed state. In FIG. 4A, the cover 11 comprises a tenon 111 fixed to the engaging element 143. The pushing element 141 comprises a bar 147. The bar 147 passes through the elastic element 142. Then both the bar 147 and the elastic element 142 are installed in the accommodating portion 156 of the base 144. The base 144 is fixed on the fixing plate 145. The engaging element 143 is pivoted on the base 144 and comprises a protrusion 155. The protrusion 155 is connected to the groove 112. The spring 146 is disposed between the sidewall 148 and the engaging element 143. The button 13 is connected to the engaging element 143.

Referring to FIG. 4B, when opening the cover 11, a user exerts a force on the button 13 along arrow A. Because the button 13 is disposed adjacent to the engaging element 143, the engaging element 143 rotates along arrow B. Thus, the protrusion 155 in the groove 112 detaches from the groove 112. Referring to FIG. 4C, the pushing element 141 is bounced along arrow C because the elasticity of the elastic element 142 is released. Thus, the pushing element 141 pushes the tenon 111 and the cover 11 (referring to FIG. 1). When closing the cover 11, a user exerts a force on the cover 11. The tenon 111 presses the pushing element 141 downward. When the groove 112 on the tenon 111 moves a position corresponding to the protrusion 155 of the engaging element 143, the protrusion 155 is engaged with the groove 112 via the compress spring 146. Thus, the cover 11 is fixed to the main body 12.

The folding electronic device 10 provides for easier usage by a user. A user only pushes the button 13 and then the engaging element 143 loosens the tenon 111. Moreover, the pushing element 141 can push and open the cover 11 automatically. The engaging structure 14 of the invention has a simplistic assembly. Thus, the volume of the engaging structure 14 does not have to be very large. The engaging structure 14 is easily assembled in the folding electronic device 10.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An engaging structure, providing an object for fixing and releasing, wherein the object comprises a groove, and the engaging structure comprises:

a pushing element for pushing and releasing the object;
    an elastic element connected to the pushing element;
    an engaging element comprising a first connector and an engaging portion, wherein the first connector is disposed adjacent to the engaging portion, and the engaging portion is detachable from the groove; and
    a base comprising an accommodating portion and a second connector, wherein the pushing element and the elastic element are disposed in the accommodating portion, the second connector is disposed at a side of the base, the engaging element is disposed on the base in a manner such that the engaging element surrounds the accommodating portion, and the first connector pivots on the second connector;
    wherein when the engaging element is rotated by a force to separate the engaging portion from the groove, the pushing element is bounced to pass through the engaging element and push the object by the elastic element.

2. The engaging structure as claimed in claim 1, further comprising a fixing plate, wherein the fixing plate is connected to the base.

3. The engaging structure as claimed in claim 1, further comprising a spring, wherein the spring comprises a hook on one side of the spring, the spring surrounds the accommodating portion, and the hook is connected to the first connector of the engaging element to fix the engaging element.

4. The engaging structure as claimed in claim 1, wherein the engaging portion is U-shaped, and the engaging portion comprises a protrusion connected to the groove.

5. The engaging structure claimed in claim 1, wherein the accommodating portion is tubular for containing the engaging element.

6. The engaging structure claimed in claim 1, wherein the engaging element comprises a bar, and the bar passes through the elastic element.

7. A folding electronic device, comprising:

a cover comprising a groove; and
    a main body comprising an engaging structure for fixing and releasing the cover, the engaging structure comprising:
        a pushing element for pushing and releasing the object;
        an elastic element connected to the pushing element;
        an engaging element comprising a first connector and an engaging portion, wherein the first connector is disposed adjacent to the engaging portion, and the engaging portion is detachable from the groove; and
        a base comprising an accommodating portion and a second connector, wherein the pushing element and the elastic element are disposed in the accommodating portion, the second connector is disposed at a side of the base, the engaging element is disposed on the base in a manner such that the engaging element surrounds the accommodating portion, and the first connector pivots on the second connector;
        wherein when the engaging element is rotated by a force to separate the engaging portion from the groove, the pushing element is bounced to pass through the engaging element and push the object by the elastic element.

8. The folding electronic device as claimed in claim 7, further comprising a button, wherein the button is connected to the engaging element, a force is exerted on the button for rotating the engaging element.

9. The folding electronic device as claimed in claim 7, wherein the engaging structure further comprises a fixing plate, and the fixing plate is connected to the base.

10. The folding electronic device as claimed in claim 7, wherein the engaging structure further comprises a spring, the spring comprises a hook on one side of the spring, the spring surrounds the accommodating portion, and the hook is connected to the first connector of the engaging element to fix the engaging element.

11. The folding electronic device as claimed in claim 7, wherein the engaging portion is U-shaped, and the engaging portion comprises a protrusion connected to the groove.

12. The folding electronic device as claimed in claim 7, wherein the accommodating portion is tubular for containing the engaging element.

13. The folding electronic device as claimed in claim 7, wherein the engaging element comprises a bar, and the bar passes through the elastic element.

14. An engaging structure, providing an object for fixing and releasing, wherein the object comprises a groove, and the engaging structure comprises:

a pushing element for pushing and releasing the object;
    an elastic element connected to the pushing element;
    an engaging element comprising a first connector and an engaging portion, wherein the first connector is disposed adjacent to the engaging portion, and the engaging portion is detachable from the groove;
    a base comprising a sidewall, an accommodating portion and a second connector, wherein the pushing element and the elastic element are disposed in the accommodating portion, the second connector is disposed at a side of the base, the engaging element is disposed on the base in a manner such that the engaging element surrounds the accommodating portion, the first connector pivots on the second connector, and the sidewall is disposed around the accommodating portion; and a spring, wherein the spring comprises a hook on one side of the spring, the spring surrounds the sidewall, and the hook is connected to the first connector of the engaging element to fix the engaging element;

wherein when the engaging element is rotated by a force to separate the engaging portion from the groove, the pushing element is bounced to pass through the engaging element and push the object by the elastic element.

* * * * *